United States Patent
Hartmann et al.

(10) Patent No.: US 7,748,793 B2
(45) Date of Patent: Jul. 6, 2010

(54) FAIL-SAFE CONCEPT FOR AN ELECTROMECHANICAL BRAKE

(75) Inventors: Henry Hartmann, Seefeld/Obb. (DE); Martin Schautt, Munich (DE)

(73) Assignee: eStop GmbH, Grafrath (DE)

( * ) Notice: Subject to any disclaimer, the term of this patent is extended or adjusted under 35 U.S.C. 154(b) by 639 days.

(21) Appl. No.: 10/996,398

(22) Filed: Nov. 26, 2004

(65) Prior Publication Data

US 2005/0127749 A1  Jun. 16, 2005

Related U.S. Application Data

(63) Continuation of application No. PCT/EP03/05645, filed on May 28, 2003.

(30) Foreign Application Priority Data

May 28, 2002 (DE) ................. 102 23 768

(51) Int. Cl.
*B60T 8/88* (2006.01)
(52) U.S. Cl. .................. 303/122.02; 303/20; 188/72.2; 188/72.7
(58) Field of Classification Search .............. 188/72.2, 188/72.1, 72.7, 72.8, 156–165; 303/20, 155, 303/122, 122.02–122.15; 188/151 A, 71.8, 188/71.9; 318/5, 14
See application file for complete search history.

(56) References Cited

U.S. PATENT DOCUMENTS

| | | | | |
|---|---|---|---|---|
| 6,003,640 A | * | 12/1999 | Ralea | 188/71.5 |
| 6,019,436 A | | 2/2000 | Siepker | 303/13 |
| 6,152,545 A | | 11/2000 | Mauser et al. | 303/20 |
| 6,153,988 A | | 11/2000 | Reimann et al. | 318/5 |
| 6,189,661 B1 | * | 2/2001 | Schaffer | 188/157 |
| 6,318,513 B1 | | 11/2001 | Dietrich et al. | 188/72.7 |
| 6,471,017 B1 | * | 10/2002 | Booz et al. | 188/72.7 |
| 6,571,163 B1 | * | 5/2003 | Heckmann et al. | 701/70 |
| 2001/0020562 A1 | | 9/2001 | Hackl | 188/161 |

FOREIGN PATENT DOCUMENTS

| | | |
|---|---|---|
| DE | 198 19564 C2 | 4/1998 |
| DE | 199 47 204 A1 | 6/2001 |
| EP | 1 026 060 A2 | 8/2000 |

* cited by examiner

*Primary Examiner*—Xuan Lan Nguyen
(74) *Attorney, Agent, or Firm*—Fitzpatrick, Cella, Harper & Scinto (57) ABSTRACT

A control system for an electromechanical brake with self-reinforcement has a unit adapted to recognize brake failure, a unit adapted to detect the actual state of motion of the device to be braked, and a unit adapted to open and close the brake upon recognition of a failure dependent upon the detected actual state of motion of the device to be braked. The unit adapted to detect the state of motion detects in particular the rotational velocity of a brake disk assigned to the brake.

16 Claims, 7 Drawing Sheets

FIG. 1

PRIOR ART

FIG. 2

PRIOR ART

FIG. 3

PRIOR ART

FIG. 4

PRIOR ART

FIG. 5

PRIOR ART

FIG. 6

PRIOR ART

FIG. 9

FAIL-SAFE CONCEPT FOR AN ELECTROMECHANICAL BRAKE

CROSS REFERENCE TO RELATED APPLICATIONS

This is a Continuation of International Application No. PCT/EP03/05645 filed May 28, 2003, and published in German but not English as WO 03/100282 A1 on Dec. 4, 2003, the priority of which is claimed herein (35 U.S.C. §120) and which claims priority of German Application No. 102 23 768.9 filed on May 28, 2002, the priority of which is also claimed herein. (35 U.S.C. §119).

BACKGROUND OF THE INVENTION

1. Field of the Invention

The present invention relates to a fail-safe concept for an electromechanical brake with self-reinforcement, in particular a control system for the implementation of a fail-safe concept of this kind.

2. Description of the Related Art

Electromechanical brakes are known per se, being disclosed for example in DE 198 19 564 C2. Electromechanical brakes of this kind with self-reinforcement have the advantage that an actuating force produced by an electrical actuator is reinforced in a purely mechanical way without the introduction of auxiliary forces, so that the portion of actuator force that is required for generating a desired frictional force between brake and brake disk is drastically reduced in comparison with conventional brakes. However, the control effort in such brakes is relatively high in comparison with known hydraulic braking systems. In addition, lawmakers have generally placed very strict conditions on the failure safety of brakes.

SUMMARY OF THE INVENTION

An object of the present invention therefore is to make available a fail-safe concept for electromechanical brakes with self-reinforcement in order to increase the failure safety of such a brake. In particular, in the event of occurrence of a failure, surely fatal consequences for the device to be braked should be avoided.

According to the invention, the occurrence of a failure is followed by opening or closing of the brake, depending upon the determined state of motion of the device to be braked, called "vehicle" in the following. The state of motion of the vehicle is determined on the basis of for example rotational velocity of a brake disk assigned to one of the brakes. In addition, it is of advantage when the state of motion of the vehicle is further specified on the basis of the variation in time of the frictional force and/or friction moment between the brake and a brake disk assigned to the brake, in order to recognize the standstill of a vehicle with certainty.

According to one aspect, the invention involves means for recognizing brake failure of an electro mechanical brake with self-reinforcement, means for detecting the actual state of motion of a device to be braked and means for opening and closing the brake upon detection of a failure dependent upon a detected state of motion of the device to be braked.

According to a further aspect of the invention there is provided a novel method of failure treatment of an electro mechanical brake with self-reinforcement. This aspect involves the steps of recognizing a brake failure, detection of the actual state of motion of a device being braked and opening or closing the brake upon recognition of a failure dependent upon the detected state of motion of the device being braked.

Various other aspects of the invention are described and claimed herein which provide additional novel features and advantages.

BRIEF DESCRIPTION OF THE DRAWINGS

Additional features, advantages and properties of the present invention will now be explained in detail with reference to the exemplary embodiments and the figures shown in the accompanying drawings, in which.

DETAILED DESCRIPTION OF THE PREFERRED EMBODIMENTS

Figure 1:
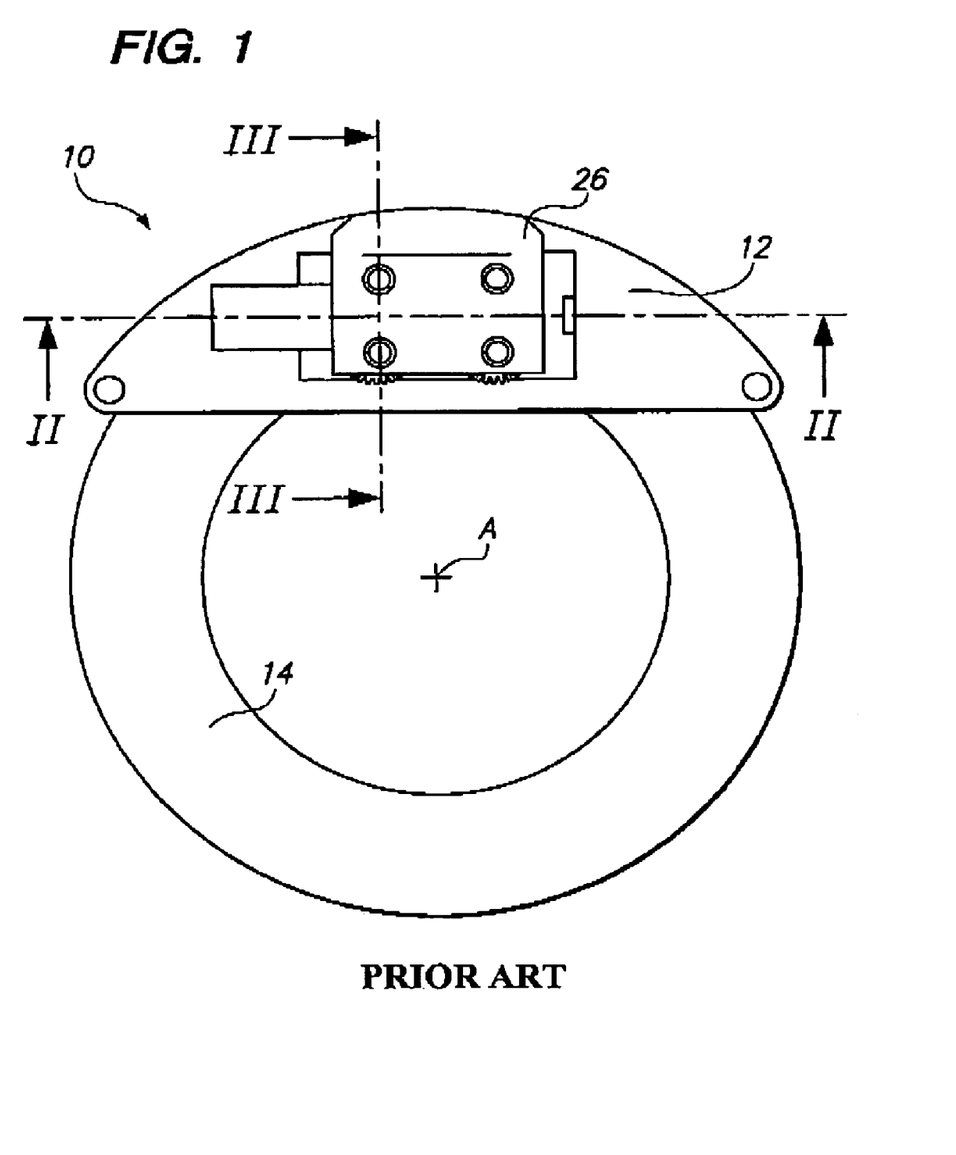
FIG. 1 outline view taken in elevation of a known electromechanical brake with self-reinforcement.
Figure 2:
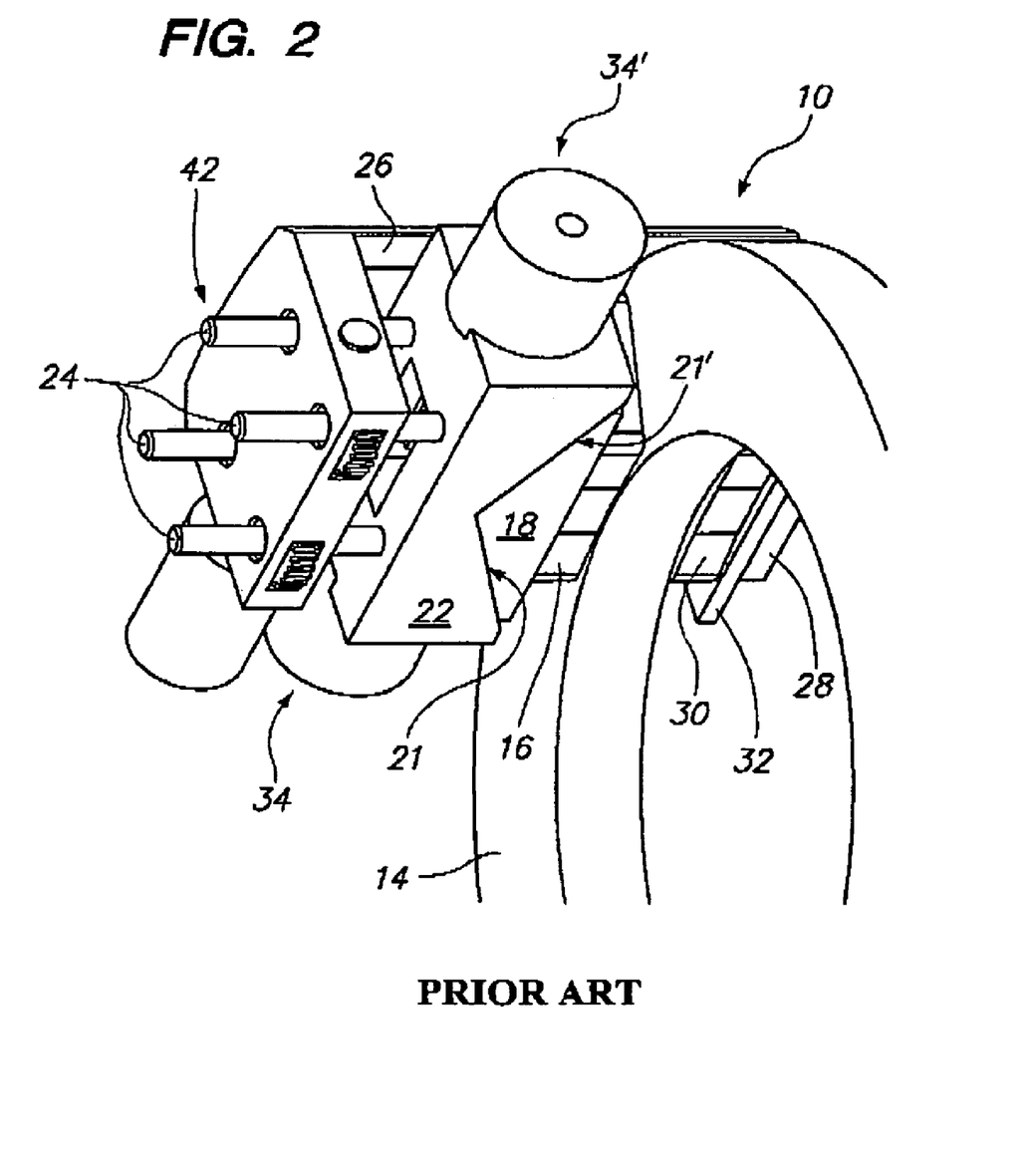
FIG. 2 is a perspective view of the brake shown in FIG. 1.

FIGS. 1 and 2 show an electromechanical brake 10, designed as a disk brake, with a housing 12 and a brake disk 14 rotating about an axis A.

Figure 3:
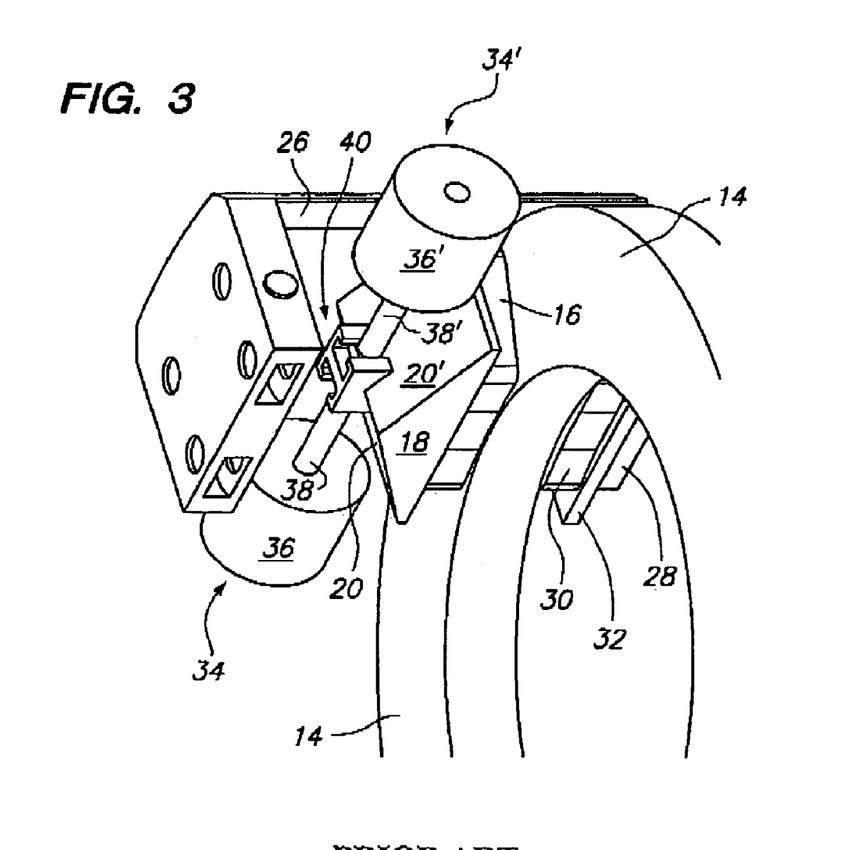
FIG. 3 is a view similar to FIG. 2 with a wedge portion and its actuator elements removed.
Figure 4:
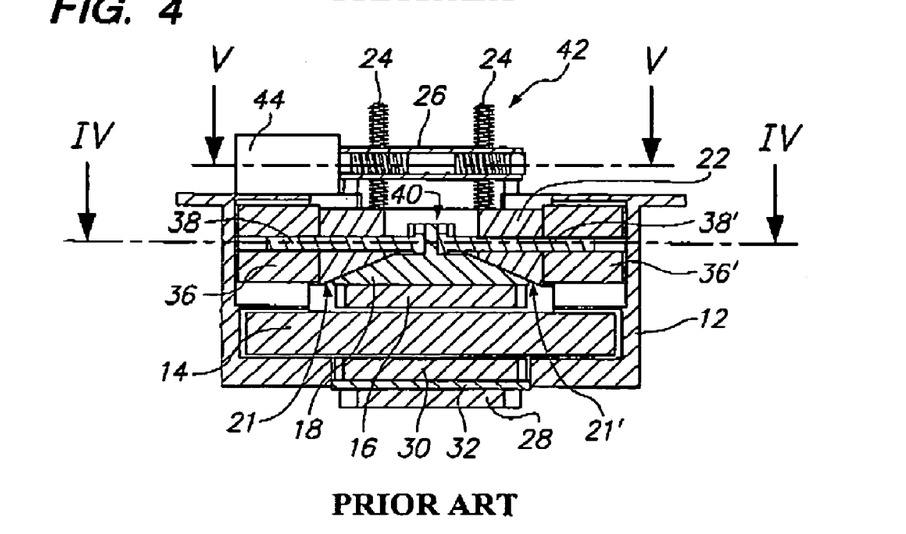
FIG. 4 is a section view taken along line II-II of FIG. 1.
Figure 5:
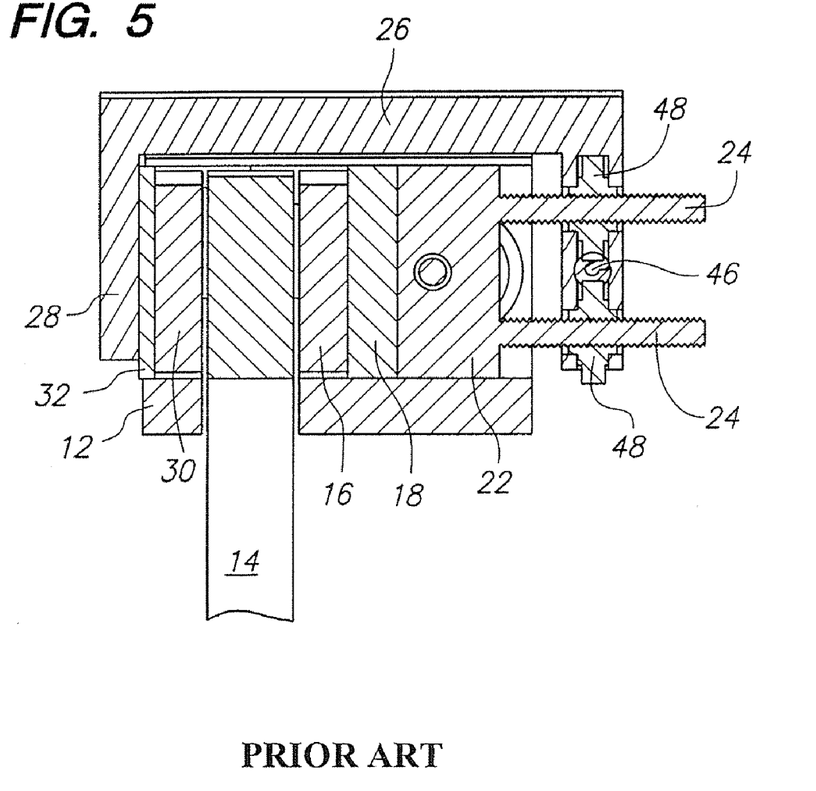
FIG. 5 is a section view taken along line III-III of FIG. 1.

As can be seen better in FIGS. 3, 4 and 5, the brake 10 has a first friction lining 16, which is firmly joined by for example bonding to the front side of a wedge 18 serving as lining support. On its back side the wedge 18 has, for each direction of rotation of the brake disk 14, a wedge surface 20 and 20', both of which are assigned to the brake disk 15 at an angle of inclination α and are supported on complementary wedge surfaces 21, 21' of a block-like support 22.

The support 22 is held by four threaded bolts 24 on a brake saddle 26 (see FIGS. 2 and 5), which bridges over the brake disk 14 and has an arm 28 pointing toward the axis of rotation. The arm 28 serves to support a second friction lining 30, which is fastened in conventional fashion onto a lining support plate 32, which rests on the inner side of the arm 28 turned toward the brake disk 14.

The actuating force of the brake 10 is produced by an electrical actuator, which comprises two drives 34 and 34', designed here as linear actuators. Each drive 34, 34' comprises an electric motor 36, 36' and a thrust rod 38, 38' driven by it, which is in functional engagement with the wedge 18. In the exemplary embodiment represented here, each electric motor 36, 36' has an integrated spindle nut (not represented) and the thrust rods 38, 38' are in each instance designed as spindles cooperating with the spindle nut. An angle-of-rotation transmitter, likewise not represented, in each electric motor 36, 36' permits determination of the exact position of the associated thrust rod 38, 38' based on the conversions performed by the electric motor 36 or 36' and the inclination of the spindle drive.

The wedge 18 and the support 22 are part of a self-reinforcing means for reinforcing the actuating force produced by the drives 34, 34'. For this purpose, the free ends of the thrust rods 38 and 38' are seated in a recess 40 present on the back side of the wedge 18 in such a way that a translational motion of the thrust rods 38, 38' results in a corresponding displacement of the wedge 18 toward the left or right (see FIGS. 3 and 4). Thus, for actuating the brake, the wedge 18 is displaced by the friction lining 16 fastened to it in the direction of rotation of the brake disk 14, specifically by a translational motion of the two thrust rods 38 and 38'. At the same time, the wedge 18 is supported by its one wedge surface 20 and 20' on the associated complementary wedge surface 21 or 21' of the support 22 and moves not only toward the left or right but also toward the brake disk 14. As soon as the first friction lining 16 comes into contact with the brake disk 14, a force of reaction is produced, which is transmitted from the friction lining 16 via the wedge 18 and the support 22 to the brake saddle 26. The latter is seated floating on the housing 12 of the brake 10 and is displaced by the said reaction force until the second friction lining 30 likewise rests on the brake disk 14 (floating saddle principle). Each additional translational displacement of the wedge 18 in the direction of actuation now results in stronger pressing of the two friction linings 16 and 30 on the brake disk 14 and hence in the desired braking operation. Release of the brake is effected by displacement of the wedge 18 back into its initial position, shown in FIG. 4. For reducing friction, the wedge surfaces 20, 20' and/or the support surfaces 21, 21' may be provided with for example rolling elements (not represented). As shown, the recess 40 is designed so that the wedge 18 is able to move in the direction of the brake disk 14 and away from it without the thrust rods 38, 38' conforming to this motion.

In order for the brake 10 to be able to accommodate itself to a friction lining as it wears down, an adjusting means 42, designated generally by 42, is present (see FIG. 2). This consists (see FIGS. 4 and 5) of a rotor 44, which drives a worm shaft 46, which is in engagement with four toothed wheels 48. The toothed wheels 48 are seated in the brake saddle 26 and in each instance have an internal thread that is in engagement with an associated threaded bolt 24, which are firmly connected with the support 22 (see FIG. 5). The toothed wheels accordingly function as spindle nuts of a spindle drive, while the threaded bolts 24 represent the spindle rods. In the exemplary embodiment shown, four threaded bolts 24 are present, of which, because of the variable direction of rotation of the toothed wheels 48, two threaded bolts 24 have a left-hand thread and the other two threaded bolts 24 have a right-hand thread. The motor 44 thus allows the adjusting means 42 to increase the distance of the support 22 from the brake saddle 26, i.e., to move the support 22 in the direction of the brake disk 14. In this way, the air space of the brake 10, i.e., the distance between the brake disk 14 and the friction lining surface existing when the brake is released, is to be kept constant.

Usually the brake 10 will be designed so that, when a great air space is detected upon braking, a control device activates the adjusting means 42 when the brake is released, in order to again reduce the air space to the structurally specified value. The adjusting means preferably is designed irreversible, in order to prevent inadvertent displacement of the air space. However, as is later explained in detail, the irreversibility of the adjusting means 42 can be defeated in the event of failure.

The adjusting means 42 described here represents an opportunity to equalize friction lining wear. Other embodiments of the brake 10 may have, instead of the motor 44, an ultrasound motor, a stepping switch mechanism, a stepping motor or another suitable drive. The drive of the adjusting means 42 may alternatively be designed in some other way, for example as a harmonic drive gear. In addition, four threaded bolts 24 need not be present as represented but, rather, there may be more or fewer threaded bolts and, lastly, means other than threaded bolts are alternatively possible, in order to obtain the relative displacement of the support 22 described here.

In connection with the treatment of failure, the adjusting means in addition has a special significance as means (actuator) for performing a so-called emergency release. An exemplary embodiment with hydraulic adjustment having automatic emergency release in the case of overload is explained later with reference to FIG. 9.

Figure 6:
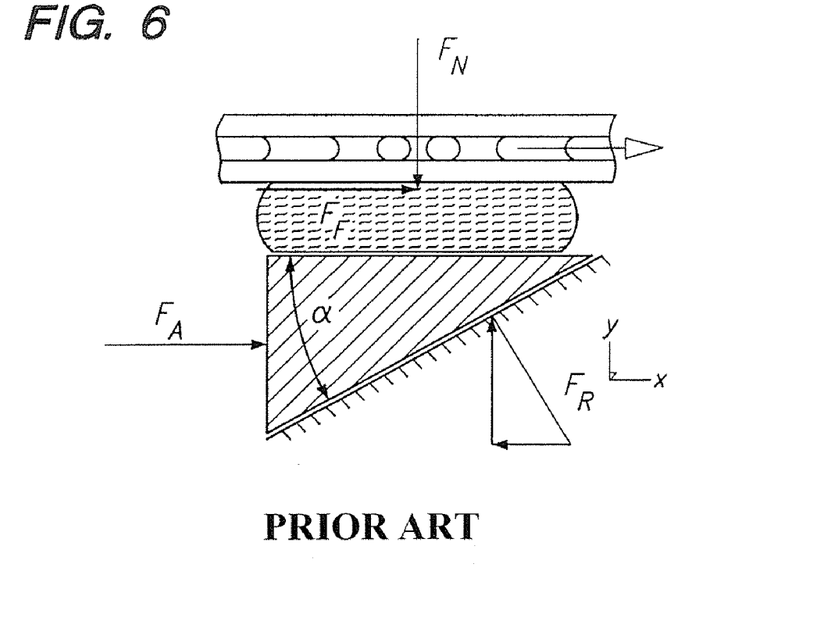
FIG. 6 is a force diagram showing the forces involved in the operation of the brake shown in FIGS. 1-5.

In the following, the function of the electromechanical brake 10 and in particular the self-reinforcing means is briefly explained with reference to FIG. 6. It has already been mentioned that the self-reinforcing means for each direction of rotation of the brake disk 14 has wedge surfaces 20 or 20', which are supported on a matching surface 21 or 21' of the support 22. In the exemplary embodiment represented, each wedge surface 20, 20' is arranged at an effective wedge angle α with regard to the brake disk 14. However, this need not be so, instead the effective wedge angle for one direction of rotation may differ from the effective wedge angle for the other direction of rotation. In FIG. 6, the forces that act on the wedge 18 are indicated by arrows.

These are:
$F_A$, the input force applied to the wedge 18,
$F_R$, the bearing force to be supported on the support 22, resulting in a pressure force which can be divided into a force $F_{Rx}$ opposed to the input force $F_A$ and a compressive force $F_{Ry}$ perpendicular to the brake disk,
$F_N$, the normal force on the brake disk, opposed to the force $F_{Ry}$, and
$F_F$, the resulting frictional force on the wedge or friction member.

The equation $F_F = \mu \times F_N$ then defines the coefficient of friction μ.

According to this equilibrium of forces, the frictional force and the moment of friction on the brake disk 14 according to the equation $$F_F = F_A \frac{\mu}{\tan(\alpha) - \mu}$$

depends only upon the angle of inclination α, the coefficient of friction μ representing a disturbance variable, and the input force $F_A$.

The input force $F_A$, which according to FIG. 6 acts on the wedge 18 upon actuation of the brake, is produced by the two drives 34, 34'. At a given coefficient of friction μ, the degree of self-reinforcement of the applied force $F_A$ depends only upon the angle of inclination α: In the state of equilibrium, i.e., when the value of the coefficient of friction μ is equal to the tangent of the angle of inclination α, the brake 10' needs no more input force $F_A$ for additional braking when the friction lining 16 is in contact with the brake disk 14. This state of equilibrium is therefore also termed the point of optimal self-reinforcement. If μ is smaller than tan α, a positive input force $F_A$ must be present in order to maintain braking. If, on the other hand, μ is greater than tan α, the brake drives on by itself, i.e., the braking force is reinforced more and more without the presence of an input force $F_A$ until locking of the brake. Should this locking status be prevented or a desired braking force be maintained, a negative input force $F_A$, i.e., an input force $F_A$ acting in the opposite direction, must be exerted on the wedge 18.

In order for the input force $F_A$ to be small, an effort has been made to operate the brake 10 in a region in which the coefficient of friction $\mu$ is at least approximately equal to the tangent of the angle of inclination $\alpha$ (below called the "normal case"). In this region of small actuating forces, the two drives 34 and 34' work opposed to each other, i.e., the two drives 34, 34' introduce, via the thrust rods 38, 38', forces directed opposed to each other into the wedge 18. The opposing forces here are sized so that an excess of force results in the direction in which the wedge 18 is to be displaced upon actuation.

Owing to the opposed working of the two drives 34, 34', actuation of the wedge 18 is free from play. This freedom from play is important for operation of the brake 10 in the region of optimal self-reinforcement since, in this region, because of the varying coefficient of friction $\mu$ during operation of the brake, a rapid change may develop between states in which $\alpha$ is smaller than $\tan \alpha$ and states in which $\mu$ is greater than $\tan \alpha$. In other words, in the region around the point of optimal self-reinforcement there may be a rapid change between states in which a positive input force $F_A$ is required, and states in which a negative input force $F_A$ is necessary in order to maintain a given, desired braking force. If the actuator were not free from play, at each change of sign of the input force $F_A$, the play present in the actuator would be transmitted, which would result in undefined states and hence in poor controllability of the brake. Actuation free from play by means of the two drives 34, 34' working opposed to each other in the normal case effectively avoids this problem.

In operating states in which the value of the coefficient of friction $\mu$ differs greatly from the tangent of the angle of inclination $\alpha$, fairly great input forces $F_A$ are required in order to obtain a desired braking effect. In such operating states, the two drives 34, 34' work together, i.e., they produce forces acting in the same direction, in that one of the drives presses on the wedge 18 and the other drive pulls on the wedge 18. To permit such operation in the same direction of the drives, the two drives 34, 34' are designed reversible, i.e., their direction of operation can be reversed. In operation of the drives 34, 34' in the same direction, the actuator of the brake 10 no longer works free from play. However, this is permissible in practice, since operating states in which elevated input forces $F_A$ are required occur only at extreme friction values. In this way, it is ensured that a change in the direction of operation cannot develop in operation, as might be the case for friction values $\mu$ in the vicinity of that of the tangent of the angle of inclination $\alpha$.

As has already been briefly mentioned, the coefficient of friction $\mu$ may vary relatively greatly as a function of the load on the brake. However, any variation in the friction value during a braking operation results in a variation in the frictional force $F_F$ and thus in a varying delay in the structural part of the brake to be braked, which in this case is formed by the brake disk 14. In order to rule out these undesirable variations in friction value, the disk brake represented is equipped with a device for determination of the friction moment. There, the device for determination of the friction moment comprises a first means for measurement of the frictional force and optionally a second means for determination of the normal force acting between the brake disk and the friction lining. For example, the frictional force is measured by a sensor that measures the force introduced into the chassis upon braking of the brake saddle.

This force results in deformations that can be measured by suitable sensors. Such a sensor is for example a strain gauge, which is mounted at a suitable location, for example on the support of the brake saddle on the chassis. In addition to the frictional force occurring upon braking, as has already been stated, the force directed normal to the brake disk and acting between the brake disk and the friction lining may alternatively be determined. In this way, it is possible to check the plausibility of the friction value measured and discover possible disturbances, in particular mechanical disturbances such as for example in the friction lining (greasing up or glazing of the linings, etc.) or in the saddle guides, by a corresponding friction value or a variation in friction value.

Targeted variations in the friction moment, as are required for example for control processes of braking slip control systems, traction control systems and travel stability control systems in motor vehicles, may be carried out quickly and exactly by the proposed braking system. The specifications for this come from a central control device 72, which among other things performs functions such as control of vehicle movement dynamics or braking assistant. Alternatively, the device for determination of the friction moment may have a first means for the determination of the actuator force and a second means for the determination of the normal force acting between the brake disk and the friction lining. As in the accomplishment above, the force directed normal to the brake disk is accordingly also determined here in order to improve the control dynamics and hence the overall quality of braking control. Instead of measurement of the frictional force, burdened with disturbance variables, however, in the second accomplishment the actuator force brought to bear during braking is determined. This permits more compact construction of the brake, because a distant sensor, mounted for example on the brake support for measuring the frictional force is no longer necessary. The friction moment is determined indirectly, without the braking force needing to be measured directly.

The coefficient of friction $\mu$ may be calculated from the equation $$F_A = F_N \times (\tan a - \mu)$$

since the wedge angle $\alpha$ is a specified and hence known geometric magnitude of the brake. With the effective brake disk radius of a likewise known geometric magnitude, the friction moment $M_{Fi}$ sought is then obtained. The friction moment $M_{Fi}$ can then be determined from the knowledge of the normal force $F_N$ and the actuator force $F_A$. The actuator force may be measured directly, preferably by a force sensor located in the flow of force of the actuator force, which may for example be a strain gauge. The force sensor may for example detect the reaction force with which an electric motor associated with the actuator is supported on the housing of the actuator or the brake. However, the force sensor may alternatively be placed at the location at which the actuator force is introduced into the wedge of the wedge arrangement. A force sensor may likewise be located in or on a force-transmitting means of the actuator, for example on a spindle or a drawbar or connecting rod.

However, the actuator force need not be measured directly, but may be determined indirectly, for example from the current of the electric motor associated with the actuator. The motor current is a measure of the moment of rotation delivered by the motor, which for example is converted by a spindle drive into an axial force. The motor current $I_{M1}$ and $I_{M2}$ (cf. FIG. 8) is therefore proportional to the actuator force produced. When demands on operating dynamics are not too high, such an indirect determination of the actuator force is a suitable and favorable accomplishment.

In the two accomplishments described above, the force directed normal to the brake disk can be measured by a force sensor located in the force flow of the normal force. For example, the normal force may be measured in the friction linings themselves or in or on the lining supports, as well as on the supporting surfaces of the wedge or the wedge arrangement, or in the saddle bridging the brake disk or even in the framework of the disk brake. Measurement of forces near the site of origin is generally advantageous, in order to avoid distortion of measuring signals due to sluggish measurement.

However, the normal force may alternatively be measured indirectly, for example from the measurement of the displacement of the wedge arrangement taking place upon a given braking action. In a braking operation, the normal force results in a widening of the saddle of the disk brake and in compression of the friction linings, [and] to a slight extent, of the brake disk as well. These elasticities of the brake are equalized by a corresponding displacement of the wedge in the direction of operation. If one position of the friction linings is designated by the term zero position, in which the so-called air space is just overcome, [i.e.,] the friction linings thus rest free from force on the brake disk, then the normal force and its variation can be calculated from the extent of the displacement of the wedge in the direction of operation. The spring characteristic of the brake system (saddle, linings, disk) is linearizable at the respective operating point, hence the normal force at the respective point of operation is directly proportional to the path of displacement of the wedge.

The path of displacement of the wedges x1 and x2 (cf. FIG. 8) may either be measured directly or it may be determined from the operating data of the actuator. For example, it is possible to calculate the path of displacement of the wedge from the angle of rotation of the electric motor associated with the actuator, in any case when the electric motor acts on the wedge by an advance system true to the inclination.

In addition, expansion of the brake saddle may be detected by a commercially available position-measuring system. Since the relationship between the expansion of the brake saddle as a function of the acting normal force is for practical purposes linear or at least reproducible, measurement of the expansion of the brake saddle represents an additional possibility for determining the normal force $F_N$.

The normal force generally is an auxiliary variable whose determination serves to improve the dynamics of control, since direct measurement of the friction moment cannot be effected quickly enough, because of the required filtering of disturbing variables. In other words, the actual value of the friction moment is only available with a certain delay. The highly dynamic operation of an electromechanical brake, possible per se, if the advantages of such a highly dynamic operation are to be utilized, requires a corresponding highly dynamic control system, which for the reasons set forth at the beginning, is not possible by measurement of the frictional force. In contrast, determination of the normal force functioning as an auxiliary variable can be effected quickly and accurately, for example by measurement of the position of the wedge, as already mentioned. Provided that the friction linings lie on the brake disk, the wedge, at the linearized operating point, is proportional to the expansion of the brake saddle and hence to the normal force $F_N$. Upon operation of the brake, released for example by an ABS control operation, should the friction moment of the brake be reduced by a given amount, the control system can calculate the required new wedge position and set it very quickly by means of the actuator. Checking of the actual friction moment is then effected by measurement of the frictional force.

Wear of the friction linings in operation of the brake results in a variation of the zero position. The zero position must therefore be repeatedly detected by the brake control system. A simple possibility for determination of the zero position is the measurement of frictional force. Namely, the frictional force increases suddenly at the moment at which the friction lining touches the brake disk. Hence, the wedge position in which the friction lining and the brake disk come into contact with each other can be simply detected.

In the following, reference is made to FIGS. 7 and 8.

Figure 8:
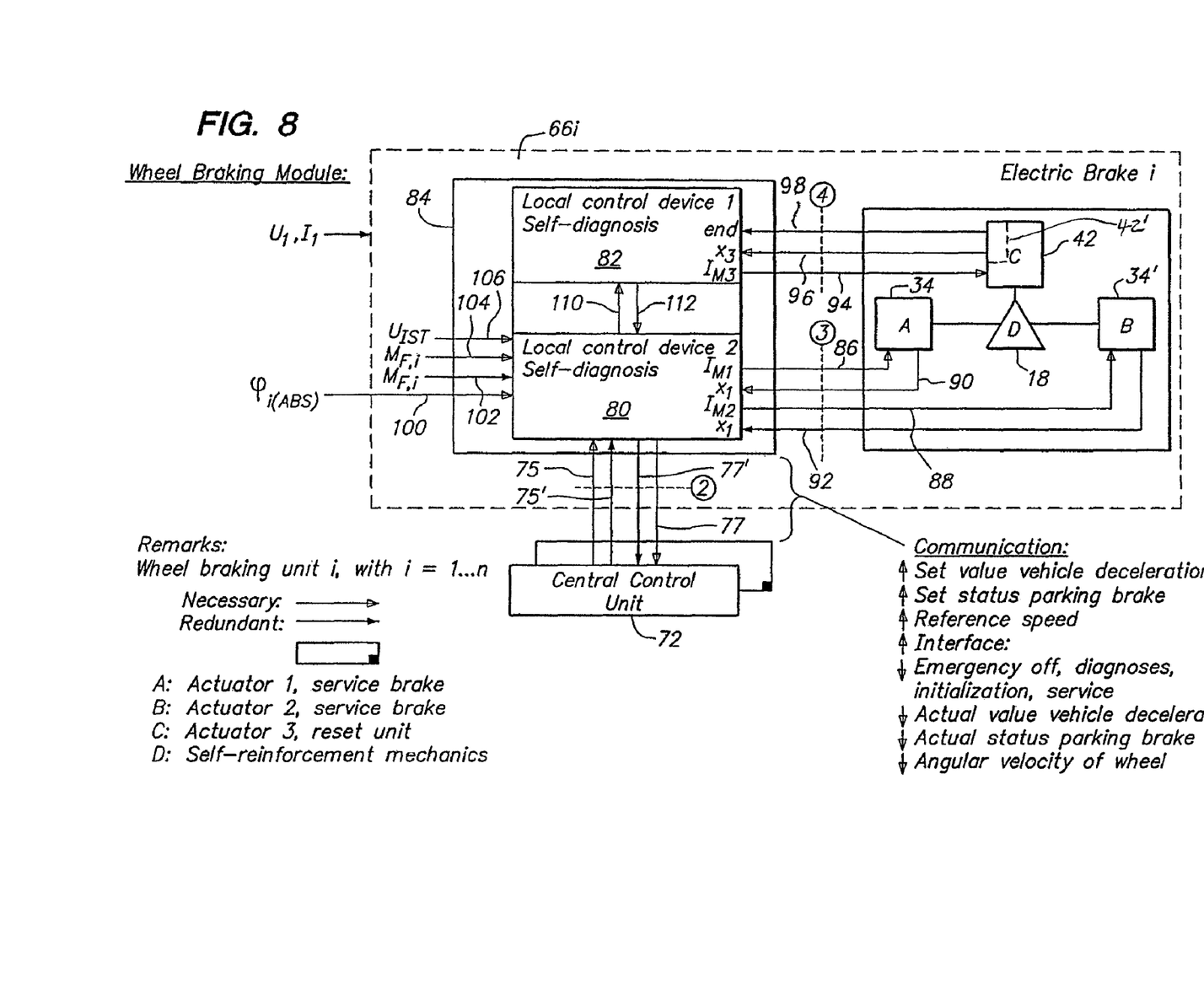

The local control device or main control unit 80 shown in FIG. 8 evaluates the signals received and in particular makes a comparison between a specified set value and the actual value of the frictional force. According to this evaluation of the signals, the drives 34, 34' are controlled by the control device so that, by displacement of the wedge 18 in or against the direction of rotation of the brake disk 14 an increase or decrease in the actual value of the frictional force is obtained in order to adjust the actual value of the frictional force to the set value of the frictional force.

In the exemplary embodiment represented, the friction-force control of the brake is obtained via a position control of the wedge 18. This is advantageous in terms of control technique, since between the wedge position and the normal force acting in the brake saddle a brief linearizable relationship exists due to rigidity of the saddle, by which the frictional force can be simply, quickly and reliably controlled. This requires the assumption of approximately constant friction conditions during a time step of the control and may for example be realized by using a cascade control which comprises an external and an internal control circuit. In the external control circuit the (desired) braking moment is the controlled variable, while the wedge position or the speed of rotation of the motor is the manipulated variable. In the internal control circuit, the wedge position or the speed of rotation of the motor is the control variable, while the manipulated variable is the current of the electric motors 36, 36' of the drives 34, 34'. The position of the wedge 18, because of the free-from-play actuation of the wedge 18 in the normal case, can be precisely determined by the said angle-of-rotation transmitters, which are contained in the electric motors 36, 36'.

Figure 7:
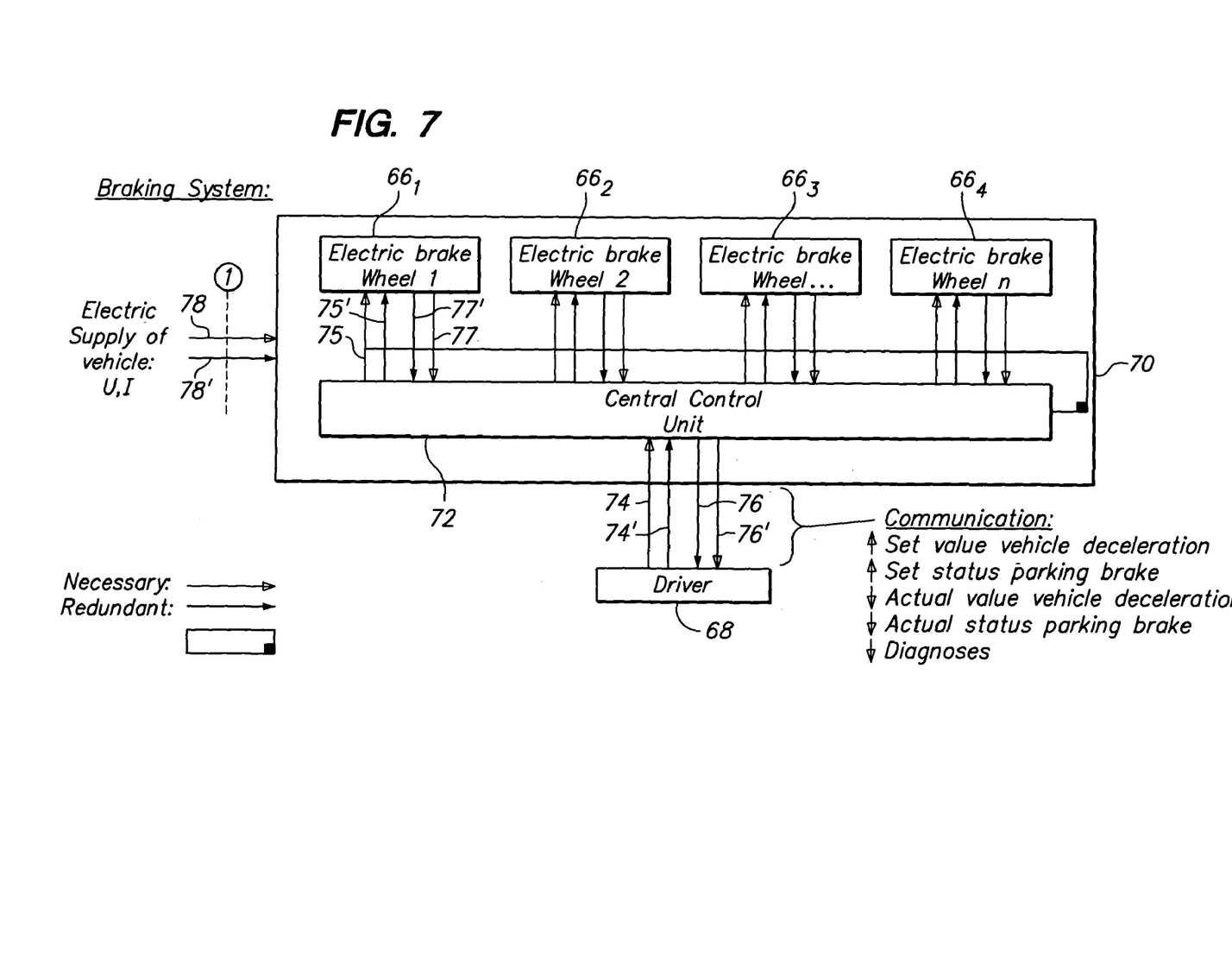
FIGS. 7 and 8 are schematic block diagrams for explanation of the control system according to the invention.

FIGS. 7 and 8 each show a block diagram for explanation of the fail-safe concept according to the invention for an electromechanical brake (EMB) with self-reinforcement, as has been shown and explained in the preceding figures. In FIG. 7 are represented a driver system 68 and a braking system 70, as well as the flow of information between these two systems. Information concerning the set value of vehicular deceleration and the set status of the parking brake (yes/no) is transmitted to the braking system 70 by the driver system 68, which comprises the braking units operated by the driver, e.g. pedals, etc. This is indicated by the arrow 74. The tip of the arrow 74 not filled in FIG. 7 is intended to indicate that this is a "necessary" flow of information.

The solid tip of the arrow 74' indicates that this is a "redundant" flow of information. These symbols apply to all arrows and flows of information represented in FIGS. 7 and 8.

Information is supplied to the overriding control means 72 of the braking system 70. The overriding control means 72 drives the individual brake modules $66_i$ of the respective vehicle. For example, in a passenger car—as represented by way of an example in FIG. 7—a braking module $66_1$, $66_2$, $66_3$, $66_4$ can be provided there for each of the four wheels. In general, there may be n braking modules $66_1$, $66_2$, . . . $66_n$ there. At the same time, the overriding control means 72, by redundant information pathways 75 and 75' and 77 and 77', exchanges information with each braking unit $66_1$, $66_2$, . . . , $66_n$, which serve to convert the respective braking instruction of the driver. The overriding control means 72 transmits the actual value of vehicular deceleration, the actual value of the parking brake and diagnostic information to the driver system 68. This is shown by the arrow 76. This flow of information is also redundant, as is indicated by the arrow 76'. There, the central control device 72 may in addition be designed redundant by the provision of a second comparable unit 72', which further increases safety.

The braking system 70 is supplied by a current supply line 78 with current I and voltage U through the vehicle's electrical system. For purposes of safety, this current supply is also redundant, as is indicated by the arrow 78'. At the same time, the second current supply 78' advantageously is supplied by a separate second circuit for example by a second battery. In this case, it is essential that the primary and the redundant current supply be disconnected from one another. If the primary current supply should fail, for example as the result of a short-circuit, the additional current supply can take place through the redundant circuit.

FIG. 8 shows one of the braking modules 66 of FIG. 7 in a slightly more detailed representation. The braking module 66 there comprises a control means 84 with a main control unit 80 and an auxiliary control unit 82, as well as a brake 10, whose structure and function have already been explained in FIGS. 1 to 6.

The main control unit 80 of the control means 84 receives from the overriding control means 72, via the information path 75, information concerning the set value of the braking moment on the corresponding wheel, concerning the set status of the parking brake or emergency brake, and the reference velocity of the vehicle. This information is transmitted redundantly via the branch 75'. In addition, an interface is available, via which a failure signal (emergency-off) as well as for example requests of the braking system for self-diagnosis or initialization, or servicing signals from the brake unit to the overriding control system may be transmitted.

The main control unit 80 transmits, via the information branch 77 of the overriding control means 72, information concerning the actual status of the braking moment of the corresponding wheel, the speed of the angle of rotation of the corresponding wheel (from the ABS sensor), as well as information concerning the self-diagnosis of the main control unit 80. This information is transmitted redundantly, as indicated by the arrow 77'.

The control means 84 works so to speak as local intelligence of the braking module 66, in order to drive the brake 10 in due and reliable fashion in normal operation as well as upon the occurrence of failures. To this end, the main control unit 80 transmits to the drives 34 and 34' of the actuator of the brake 10 the motor currents $I_{M1}$ and $I_{M2}$ via the two branches 86 and 88, respectively. The drives 34 and 34' are driven by the two motor currents $I_{M1}$ and $I_{M2}$ according to the commands and control variables transmitted by the driver system 68 (not represented in FIG. 8). The two drives 34 and 34' transmit to the main control unit 80 the position information $x_1$ and $x_2$ of the position of the wedge 18 in each instance via the branches 90 and 92. Here, plausibility checks of the two position signals permit conclusions regarding the mechanical status of the system, such as for example regular wear or failure of a drive train (spindle fracture).

The main control unit 80 in addition receives, via the branch 106, the measured voltage $U_{IST}$ from the vehicle's electrical system for failure recognition, as well as information regarding the braking moment $M_{Fi}$ (or other suitable auxiliary variables) on the respective wheel. The information concerning the braking moment $M_{Fi}$ is supplied redundantly via the two branches 102 and 104, where the sensor may be physically redundant. The braking moment $M_{Fi}$ of the respective wheel is equivalent to the friction moment $M_R$ mentioned further above and is either supplied to the main control unit 80 or calculated from it, for example from the other auxiliary variables mentioned further above, as is described further on. In addition, the main control unit 80 is supplied with the speed of the angle of rotation of the respective wheel by the assigned ABS sensor via the information branch 100.

With reference to the auxiliary control unit 82, the main control unit 80 is the dominant control unit. All of the self-diagnoses of the two control units are exchanged 110, 112 between the main control unit 80 and the auxiliary control unit 82. The auxiliary control unit 82 controls the adjusting means 42 of the brake 10 via the motor current $I_{M3}$, which is supplied to the adjusting means 42 via the line 94. From the adjusting means 42, the auxiliary control unit 82 receives the position information $x_3$ regarding the position of the adjusting means 42, as well as information, whether the adjusting means 42 is located at the position of the travel stop, i.e., in fully open position.

The main control unit 80 and the auxiliary control unit 82 may then be supplied by a voltage $U_1$ and a current $I_1$ from a local energy supply. This local energy supply preferably is provided electrically (for example, by a condenser), but may for example alternatively be a fuel cell. If a rotary motion is present on the structural part to be braked, a generating method is also possible. For carrying out setting movements, local mechanical stores of energy (springs) may be used in addition.

As already mentioned above, the present invention relates to a fail-safe concept with local fail-safe intelligence for recognition of the failure function to be performed. The local fail-safe intelligence here consists of the main control unit 80 and the auxiliary control unit 82 of the control means 84. In particular, it is thereby ensured that in the event of occurrence of a failure in the control system, i.e., in case of a disturbance in the vehicle's electrical system, in case of a disturbance in communication between the overriding control means 72 and the wheel braking unit 66, a disturbance of the brake 10 (disturbance of the adjusting unit 42 or service brake unit 34, 34', 18), a failure treatment is performed in the brake. The fail-safe concept according to the invention, explained in detail below, ensures that the brake 10, despite occurrence of a failure dependent upon the state of movement of the vehicle remains open or is emergency-opened, and in the standing vehicle is tightened or remains tightened. Inadvertent closing of the brake caused by malfunction in a moving vehicle must absolutely be prevented. On the other hand, in a standing vehicle it must be ensured that even in the event of occurrence of a failure, the vehicle remains standing still. These functions are provided by the present invention.

The main control unit 80 makes the decision concerning the error function to be performed from the state of motion of the vehicle, namely in particular from the rotational velocity of the respective wheel, which is supplied by the ABS sensor, and/or concerning the variation in time of the braking moment $M_{F1}$ on the wheel. The rotational velocity of the wheel alone is insufficient, since for example when sliding on a patch of ice and simultaneous full braking, the wheel locks up (at least initially), so that the variation in time of the rotational velocity of the wheel is equal to zero but the vehicle is still in motion. If the main control unit 80 were to make the decision to open or to close the brake 10 in the event of occurrence of a failure only on the basis of this information, there would be a high risk of accident.

Therefore, according to the invention, the variation in time of the braking moment $M_{F1}$ of the wheel is considered in addition. If it is equal to zero, and the rotational velocity of the wheel is likewise equal to zero, the vehicle is actually at a standstill and the main control unit 80 can close the brake or keep it closed. If, on the other hand, one of the two values is not equal to zero, the vehicle is in motion and the brake 10 must be emergency-opened, or must remain open. The invention thus is based on the recognition that even when the rotational velocity is equal to zero, i.e., the wheel is not turning, the vehicle is nevertheless in motion, e.g., is sliding [and] the variation in time of the respective braking moment is not equal to zero, since great forces act on the brake in a motion of the vehicle with a locked wheel. In a refinement of the invention, the amplitude for example of the variation in time of the braking moment $M_{F1}$ can be measured in order, in case of low values that signal only a very slow and slight motion of the vehicle, to cause closing of the brake 10, so as finally to bring the vehicle to a stop without running the risk of an accident. For plausibility checking, additional signals, such as for example the estimated vehicle reference speed, are in addition available when communication with the rest of the vehicle is intact.

In the failure case of "communication disturbance to the overriding control means 72," opening of the brake 10 takes place via the drives 34 and 34', likewise in the failure case of "disturbance in the adjusting/emergency release unit 42." In the failure case of "disturbance in the service brake unit 34, 34'," opening of the brake takes place via an emergency opening of the adjusting unit 42. Then in the case of failure, a failure function is carried out, the wheel braking unit 66 is deactivated and, if communication to the overriding control means 72 is still possible, a failure message to the driver is generated.

Should communication between the overriding control means 72 and the wheel braking unit 66 be interrupted, the local intelligence, i.e., the main control unit 80 and the auxiliary control unit 82 takes over the failure treatment and the overriding control means 72 generates a failure message to the driver. At the same time the failure function is reported, which the local intelligence most likely carries out. Failure safety can be further increased by provision of a local energy supply, such as for example a condenser, which permits the one-time performance of an active failure function (release or setting of the brake 10), although the current/voltage supply by the vehicle's electrical supply has been completely interrupted. In addition, division of the local intelligence into two intelligent subsystems, i.e., the main control unit 80 and the auxiliary control unit 82, permits takeover of the functions by the other, uninterrupted control unit in case of interruption of one of the two control units. In the normal case, however, the main control unit 80 is the dominant control unit. The main control unit 80 preferably is designed digital, the auxiliary control unit 82 likewise. Alternatively, the two control units may also be designed analog, or alternatively only the auxiliary control unit 82. In addition, the electrical actuator of the brake 10 is designed with two drives 34 and 34' acting symmetrically insofar as advantageous, since failure functions of the brake unit (service brake) are recognizable from the respective position $x_1$ and $x_2$ of the two drives 34 and 34' as well as from the drive information, i.e., the motor current $I_{M1}$ and $I_{M2}$.

In addition, the symmetrical drives 34 and 34' and the information transmitted to the main control unit 80 can be used for self-diagnoses in non-critical cases of failure, such as for example for wear in the drive train. The adjusting means 42, as mentioned above, is at the same time the adjusting unit for the wear of the brake linings and the emergency release unit for the case of a disturbance of the service brake unit. In addition, the adjusting unit 42 is provided with a limit sensor 42', which detects whether the adjusting unit 42 is open. This information advantageously is stored in the system so that even when the vehicle and its electrical system are laid up for a long period, it can still be read out. It should once again be emphasized that the adjusting unit 42 permits adjustment only in case of an open brake, i.e., without load. In addition, the active release or emergency opening is carried out even under load. Then energy is taken out of the spring storage system of the brake saddle—thus, no additional energy need be brought into the system. Under normal conditions, the adjusting unit 42 keeps the wedge 18 under braking load.

Figure 9:
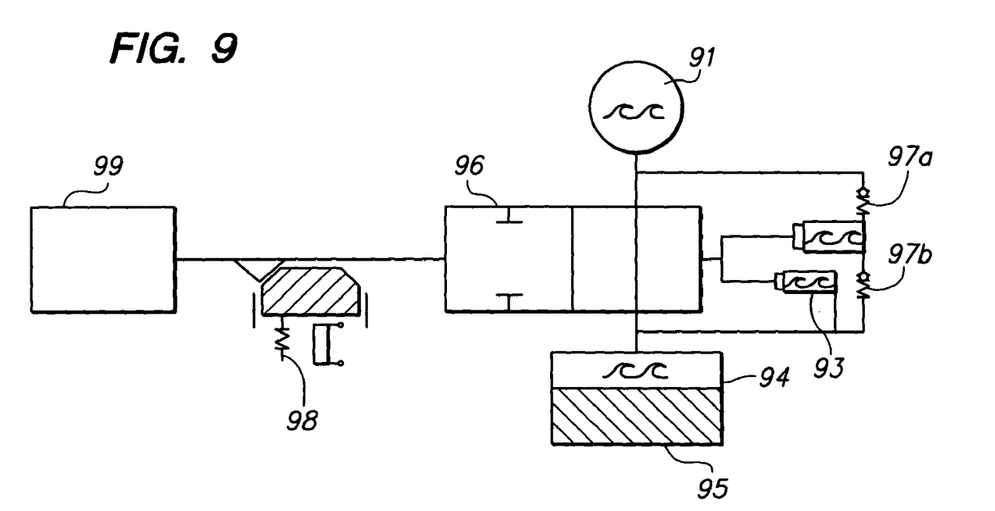
FIG. 9 is a schematic of an additional exemplary embodiment, in which the irreversibility of an adjusting unit in the event of failure can be suspended, in order thus to permit rapid opening of the brake.

A possible exemplary embodiment as a hydraulic adjustment with automatic emergency release in the case of overload will now be explained with reference to FIG. 9.

The cylinder 94 produces adjustment of the brake by acting on the mechanism 95 to be adjusted. The reservoir 91 is a standard container for the hydraulic fluid and represents a closed volume capable of expansion. Via the linear drive element 99, designed for example as a coil with solenoid plunger, a pumping motion and hence the pumping operation is performed. This drive element 99 in addition actuates the two-way valve 96, which separates the reservoir 91 from the cylinder 94—or permits equalization of pressure. 98 generally designates a bistable locking device with overload function, which has a spring and a magnetic coil and may for example be actuated electrically for a pumping operation.

The valves 97a and 97b allow hydraulic fluid to be pumped from the reservoir 91 to the cylinder 94 for adjustment.

92 designates the pump piston, which, via the valves 97a and 97b, can pump hydraulic fluid from the reservoir 91 to the cylinder 94 for adjustment.

The piston 93 performs the overload function (emergency opening) of the adjustment, since it is impacted by the pressure from cylinder 94 and thus exerts a force in the direction of the bleed position of the valve 96. It is thus additionally ensured that, for release of the brake, no drive energy need be supplied for the drive element 99—it is sufficient to release the locking device 98 for a brief period, so that the valve 96 permits the reduction of pressure in the cylinder 94.

In this connection, it is essential to note that the locking device 98 ensures that in case an emergency opening of the brake is carried out, force can no longer be built up in the cylinder 94 and hence in the brake forks.

In addition, additional embodiments are possible. One possibility is represented by an independent mechanical actuator, which has a reversible spindle drive that is provided with a locking mechanism. This locking mechanism may be actively released via an additional actuating element. In case of such an emergency opening, the energy stored in the mechanical system brake tongs is released via the automatically acting spindle and the clamping force thus reduced.

In addition, let non-failure-free emergency opening mechanisms be mentioned, which interrupt the flow of force by for example pyrotechnical effects (percussion cap, etc.). An ignition spark for the release of such a system could come for example from a piezoelectric element, which converts the deformations of brake parts caused by the tightening force of the brake parts into an electrical voltage, and in this way thereby leads to automatic emergency opening at unacceptably high forces.

A detailed list of failure cases and components follows below. This is once again followed, under the heading of "Fail-Safe Concept" by the general requirements and proposed accomplishments of the present invention. It is to be noted in each instance that the service brake BB and the parking brake FB represent different functions of the brake 10 in the various types of operation.

Failure in the Electrical Supply of the Vehicle

Disturbances of the electrical supply U in a wheel brake module 66 will be considered first.

In case of failure of the primary 78 electrical supply U of the vehicle in a wheel brake module 66, the continued supply of current is provided by the redundant circuit 78'. Consequently, the full functionality of the affected brake module 66 is maintained. In addition, a failure message "Service" is sent to the driver. The same procedure is followed in the event of a short-circuit of the primary 78 electrical supply U of the vehicle. For this case, it is essential that the primary 78 and the redundant 78' current supply be decoupled from each other.

In case of a total failure of the electrical supply U in a wheel brake module 66, that is, in a failure of the primary 78 and the redundant 78' current supply, the local energy store $U_1$ of the affected wheel brake module 66 is used. This is designed in such a way that a one-time active failure function can be carried out. The wheel brake module 66 is thereby deactivated.

Disturbances of the current supply U affecting the entire braking system 70 are considered in the following.

In case of a failure of the primary 78 electrical supply U of the vehicle in the braking system 70, the additional current supply is provided by the redundant circuit 78'. The full functionality of the braking system 70 can therefore be maintained. In addition, a failure message "Service" is relayed to the driver. The same procedure is followed in case of a short-circuit of the primary 78 electrical supply U of the vehicle. For this case, it is essential that the primary 78 and the redundant 78' current supply be decoupled from one another.

In case of a total failure of the vehicle's electrical supply U in the braking system 70, i.e., in case of a failure of the primary 78 and the redundant 78' current supply, the local energy supplies $U_1$ of the affected wheel brake modules 66$_i$ are deployed. These energy supplies are designed in such a way that a one-time active failure function can be performed, whereby all wheel brake modules 66$_i$ are deactivated. In a standing vehicle, the parking brake is activated or remains activated. In a running vehicle, the brakes are opened or an emergency brake function is activated, which, locally controlled for example, exerts a small non-critical braking moment on the wheels.

If the vehicle's electrical supply is disconnected, in connection for example with assembly or servicing work, the wheel brake unit 70 is operated in the service mode. This may be done for example by software or alternatively by grounding, effected manually. The disassembled wheel brake unit 66 is then free from force and energy.

Failure Concerning Communication Between the Central Control Device 72 and a Wheel Brake Unit 66

Upon occurrence of an inconsistency in the self-diagnosis of the wheel brake unit 66, a one-time failure function is executed by the local intelligence 84 and the wheel brake unit 66 is deactivated. The same procedure is followed in case of an inconsistency between information from the wheel brake unit 66 and the central control device 72. In addition, the same procedure is followed when an emergency-off signal is sent by the central control unit 72 to the brake unit 66.

In case of an inconsistency in the external diagnosis of the central control device 72, an emergency-off signal is sent by the central control device 72 to the brake unit 66 and—as mentioned above—the wheel brake unit 66 is thereupon deactivated.

Failure Due to Disturbance of the Wheel Brake Unit 66

If the maximum motor current is exceeded, this failure may be caused by a defective drive train (spindle/bearing/motor) or by excedence of the maximum friction value. In this case, an emergency release of the brake by means of the adjusting unit 42 is triggered and the wheel brake unit 66 is deactivated. In addition, an error message is sent to the central control device 72.

A defect in the drive train (spindle/bearing/motor) may result in faulty brake operation. A failure of this kind can be recognized from the data of the two motors 34 and 34'. In this case, an emergency release of the brake is triggered by the adjusting unit 42 and the wheel brake unit 66 is deactivated. In addition, a failure message is sent to the central control device.

Excedence of the static friction value may (as "special case") result in release of the parking brake, the aid of the service brake not being possible. In this case, release of the brake may be effected by the emergency-release function of the adjusting unit. After that, the wheel brake unit can again be put into operation normally.

Failure Due to Disturbance of the Adjusting Unit 42

A defect in the drive train (spindle/bearing/motor) may result in the maximum motor current being exceeded. In this case, the wheel brake unit 66 is deactivated and a failure message is sent to the central control device 72.

A defect in the drive train (spindle/bearing/motor) may also result in the occurrence of a defect upon operation of the adjusting unit 42. Such a failure may be detected from data 96 of the motor 44 of the adjusting unit 42 or alternatively from data 98 concerning the end stop. In this case, too, the wheel brake unit 66 is deactivated and a failure message is sent to the central control device 72. At the same time, opening of the brake by the still intact service brake unit is carried out.

Some features of the invention are now to be listed again:

The local control means is able, with the aid of the local main and auxiliary control means, to perform local plausibility checks and consequently detect local failures, detect failures in other brake actuators or ensure detection of their failure and, by plausibility checks, detect failures in the central control means of a vehicle (for example, faulty specifications from the central control device) or ensure detection of their failure.

The local control means may be made up of more than one processor and therefore have an additional redundancy.

"Control devices" in the context of the present description comprises control or regulation as well as a combination thereof.

According to the invention, "control devices" may be designed analog and/or digital.

The failure strategies for front and back wheels may be different.

The possibility exists of treating failure by opening of the brake with the aid of the service brake actuators in case of occurrence of a failure in for example the adjusting means.

In case of failure of one service actuator, the possibility exists of treating the failure, e.g. emergency opening, with the second service actuator.

The possibility exists of treating failure by emergency release with the aid of the adjusting means.

Diagnosis in the individual brakes may take place staggered in time (not all brakes in the diagnosis/initialization mode at the same time).

What is claimed is:

1. A control system for an electromechanical brake for braking a device, said control system comprising:
   means for recognizing brake failure of the brake, wherein the brake includes a self-reinforcement arrangement;

means for detecting an actual state of motion of the device based upon a rotational speed of a brake disk assigned to the brake and a frictional force or moment between the brake and the brake disk; and means for one of opening and closing the brake upon recognition of the failure dependent upon the detected actual state of motion of the device, wherein the brake includes adjusting means configured to open the brake upon the brake failure being recognized, the adjusting means including a limit sensor arranged to monitor a position of the adjusting means, to de-activate operation of the brake.

2. A control system for an electromechanical brake according to claim 1, wherein the brake has:

at least one friction lining, wherein the adjusting means compensates for wear and tear of the friction lining.

3. A control system for an electromechanical brake according to claim 1, wherein the means for one of opening and closing the brake, upon recognition of the failure, open or leave open the brake if detection of the actual state of motion indicates a motion of the device is above a threshold value.

4. A control system for an electromechanical brake according to claim 1, wherein the means for one of opening and closing the brake, upon recognition of the failure, close or leave closed the brake if detection of the actual state of motion indicates standstill or a motion of the device is below a threshold value.

5. A control system for a device equipped with a plurality of electromechanical brakes, said control system comprising:

for at least one given brake, local control means including (a) means for recognizing brake failure of the given brake, wherein the brake includes a self-reinforcement arrangement, (b) means for detecting an actual state of motion of the device based upon a rotational speed of a brake disk assigned to the given brake and a frictional force or moment between the given brake and the brake disk, and (c) means for one of opening and closing the given brake upon recognition of the failure dependent upon the detected actual state of motion of the device to be braked; and an overriding control unit for the plurality of brakes, wherein the brake includes adjusting means configured to open the brake upon the brake failure being recognized, the adjusting means including a limit sensor arranged to monitor a position of the adjusting means, to de-activate operation of the brake.

6. A control system according to claim 5, wherein the local control means comprises a main control means for the control of a service brake and an auxiliary control means for the control of an adjusting means for the service brake, wherein the at least one given brake comprises the service brake.

7. A control system according to claim 6, wherein the local control means is constructed to recognize failures, to decide on the strategy for failure treatment and to carry out failure treatment.

8. A control system according to claim 6, wherein the local control means is constructed to recognize failures autonomously, to decide on the strategy for failure treatment and to carry out failure treatment irrespective of whether communication to said overriding control unit is interrupted.

9. A control system according to claim 6, further including a local emergency energy supply for powering the local control means to perform an active failure function operation of the brake.

10. A control system according to claim 6, wherein the local control means is constructed to carry out a plausibility check of incoming signals.

11. A control system according to claim 5, wherein the at least one given brake has:

at least one friction lining, wherein the adjusting means compensates for wear and tear of the friction lining.

12. A method of failure treatment in an electromechanical brake for braking a device, said method comprising the steps of:

recognizing brake failure of the brake, wherein the brake includes a self-reinforcement arrangement;

detecting an actual state of motion of the device based upon a rotational speed of a brake disk assigned to the brake and a frictional force or moment between the brake and the brake disk; and opening or closing the brake upon recognition of the failure dependent upon the detected actual state of motion of the device, wherein the brake includes adjusting means configured to open the brake upon the brake failure being recognized, the adjusting means including a limit sensor arranged to monitor a position of the adjusting means, to de-activate operation of the brake.

13. A method according to claim 12, wherein upon recognition of a failure, the brake is opened or is kept open if detection of the actual state of motion indicates a motion of the device to be braked is above a threshold value.

14. A method according to claim 12, wherein upon recognition of a failure the brake is closed or kept closed if detection of the actual state of motion indicates standstill or motion of the device to be braked is below a threshold value.

15. A method according to claim 12, wherein upon recognition of a failure, the failure treatment strategy is decided on and the failure treatment is carried out.

16. A method according to claim 15, wherein a plausibility check of signals is carried out.

* * * * *